(12) United States Patent
Kitahara

(10) Patent No.: US 6,615,852 B1
(45) Date of Patent: Sep. 9, 2003

(54) CLEANING MACHINE FOR DIE USED FOR SYNTHETIC RESIN MOULD

(75) Inventor: Shoji Kitahara, Samutprakan (TH)

(73) Assignee: Aqua Sonic Service Co., Ltd., Samutprakan (TH)

( * ) Notice: Subject to any disclaimer, the term of this patent is extended or adjusted under 35 U.S.C. 154(b) by 0 days.

(21) Appl. No.: 09/609,332

(22) Filed: Jun. 30, 2000

(30) Foreign Application Priority Data

Dec. 27, 1999 (TH) .............................................. 054865

(51) Int. Cl.⁷ ................................................. B08B 3/12
(52) U.S. Cl. ........................... 134/111; 134/61; 134/76; 134/135; 134/201
(58) Field of Search ................................ 134/1, 40, 61, 134/76, 82, 135, 137, 147, 201

(56) References Cited

U.S. PATENT DOCUMENTS

| | | | |
|---|---|---|---|
| 4,762,638 A | 8/1988 | Dollman et al. | ............ 252/135 |
| 5,024,744 A | 6/1991 | Okabayashi | ................ 204/194 |
| 5,104,501 A | 4/1992 | Okabayashi | ............. 204/141.5 |
| 5,795,400 A | * 8/1998 | Berger et al. | .................. 134/10 |
| 6,145,518 A | * 11/2000 | Huffman | ..................... 134/105 |
| 6,279,584 B1 | * 8/2001 | Huffman | ......................... 134/1 |

FOREIGN PATENT DOCUMENTS

| | | | |
|---|---|---|---|
| JP | 01-105115 A | * | 4/1989 |
| JP | 07214570 A | * | 8/1995 |
| JP | 09164533 A | * | 6/1997 |
| JP | 11128853 A | * | 5/1999 |
| JP | 11129259 A | * | 5/1999 |

\* cited by examiner

*Primary Examiner*—Randy Gulakowski
*Assistant Examiner*—Joseph Perrin
(74) *Attorney, Agent, or Firm*—Armstrong, Westerman, & Hattori, LLP.

(57) ABSTRACT

A machine for cleaning a die by using electrolysis and ultrasonic vibration which has in combination a degreasing processing system, an electrolytic-cleaning system with an electrolyte circulator system, and a rinse system. The die, in a container, is dipped into an electrolytic liquid tank with an ultrasonic vibrator, and it is electrolyzed in a cleaning medium for large sized dies and die components.

9 Claims, 5 Drawing Sheets

CLEANING MACHINE FOR DIE USED FOR SYNTHETIC RESIN MOULD

BACKGROUND OF THE INVENTION

1. Field of the Invention

The field of art to which the invention pertains includes "Maintenance; Cleaning," subject matter classifiable in IPC B29C. This invention is concerned with a medium-sized synthetic resin mould cleaning machine. More specifically, it enables elimination of attachments adhering to the resin building side of the mould, etc., such as resin dregs and gas burning, certainly for a short time.

2. Description of the Prior Art

Resin attaches, for example, as burnt remains in a mould for resin dregs and gas to the internal surface of parietal bone in connection with the amount of building of a resin product. This attachment hinders the separation of the product from the mold which later carries out resin building, and it produces misarrangement, such as in connection with invalid building. Especially, using the upswing technique of a synthetic resin mold, in order to have demanded extraordinary accuracy, this attachment had become the prime factor which worsens mold accuracy in recent years. In order to eliminate this attachment conventionally, after soaking the metal die component disassembled from the mould in kerosene half a day, the operator polished with a brush. However, since moulds are expensive, this polish operation must be performed carefully, so it is very troublesome to insure that damage may not occur. Moreover, when taking the time of up to 1 day to polish the metal mould component of a piece, there is also the problem of bad workability.

First, the mold automated cleaner of Japanese Patent (Tokkai-Hei No. 10-631) using a brush was invented in 1996. Afterwards, the cleaning method of Japanese Patent (Tokkai-Hei No. 11-90938) using a heat penetrating-remover composition as a strong base, or the cleaning method of irradiating or the lasers of Japanese Patent (Tokkai-Hei No. 11-99524, U.S. Pat. No. 5,373,140) were devised. There was also a cleaning station, as in Japanese Patent (Tokkai-Hei No. 11-156865), which injects a liquid for eliminating an attachment.

On the other hand, the cleaning method using a supersonic wave and electrolysis is described in Japanese Patents (Tokkai-Hei No. 11-269700, Tokkai-Hei No. 11-129259, Tokkai-Hei No. 11-128853, Tokkai-Hei No. 9-164533, Tokkai-Hei No. 7-214570), which have been put to practical use recently.

This cleaning method involves dipping the mould into the core of the cleaning tank which accommodates electrolytic-cleaning liquid with an electrode board linked to an anode (+). The dipping connects the mould to the cathode (−) through above-mentioned electrolytic-cleaning liquid. In this cleaning method using the electrolysis method, the above-mentioned attachment floats from the mould, and it is washed from the mould, generating bubbles of electrolysis gas from the core of the electrode board and the mould, floating the attachment using a supersonic wave, and making electrolytic-cleaning liquid agitate with this electrolysis gas.

OBJECT OF THE INVENTION

Regarding the prior art, in the case of using the washing method of the above-mentioned prior art electrolysis formula, attachments cannot reliably be removed if the part of the die which is washed is not in alignment linearly with the above-mentioned electrode board. For example, in the case of a concave slot with a depth of 3 mm, and a width of 2 mm, the base of this slot, i.e., the segment which becomes shaded, cannot be washed. Moreover, since it resists the electric current which sends electric currents, it becomes hard to generate electrolysis gas, and it is therefore connected with too much increase in work time. Consequently, alkali burning occurs on the surface of the die, which will produce more of the above-mentioned attachment. Furthermore, the churning efficiency of electrolytic-cleaning liquid by the evolution of cracked gas may be limited, and the attachment that was removed may adhere to the die again.

Moreover, regarding prior art even with washing using an ultrasonic vibrator, the cleaning effect seldom increases as a result the convection current of electrolytic-cleaning liquid. Moreover, if a strong electrolyte of an alkali remains adhered to the die after washing, alkali burning will occur, and there is a possibility that it may no longer be possible to function as an expensive metallic die. Moreover, although there was also an apparatus which agitated an electrolyte by a churning component containing an electrode, etc., it became too complicated to make a device for washing a detailed die. There was also a blemish making it not suitable as a die of intermediate magnitude.

This invention was made in view of the above-mentioned problems, and it is for middle sized objects for synthetic resins of the magnitude of approximately 20 cm–30 cm die length, which can eliminate the attachment adhering to the metallic die reliably for a short time. It aims at offering the washing system of a die.

MEANS FOR SOLVING THE PROBLEM

The electrolytic-cleaning apparatus consists of a degreasing processing device, an electrolyte circulator style electrolytic-cleaning device, a rinse device in which an electrolyte is eliminated from the above-mentioned die, and a humidity decreasing device. An ultrasonic transducer generates ultrasonic agitation in the cleaning-chemical liquid tank, which accommodates electrolytic-cleaning liquid and has a receipt container and a container hanging implement. The metal die, contained in a receipt container, is hung and flooded with electrolytic-cleaning liquid, the die is attached to an electrode in this receipt container in this washing tank, and this electrode and the above-mentioned metal receipt container are connected to the plus and minus side, respectively. Through the above-mentioned electrolytic-cleaning liquid, the electric current travels, and with the above-mentioned apparatus, a metal die is cleaned.

As shown, e.g., in FIG. 1, the degreasing tank 2 of the above-mentioned washing station specifically accommodates a degreasing solvent. The cleaning-chemical liquid tank 3 accommodates electrolytic-cleaning liquid. The ultrasonic transducer 11 has an ultrasonic transducer on the base outside of the above-mentioned cleaning-chemical liquid tank 3, and it vibrates the above-mentioned electrolytic-cleaning liquid. The retention stick accommodates a washed thing in the core of metal frame body, and projects from frame body 9-1, which hangs and dips a washed thing into the above-mentioned cleaning-chemical liquid tank 3, while it loads freely and floods with the above-mentioned electrolytic-cleaning liquid. The above-mentioned retention implement consists of a conductive metal frame-like basket 4, which has a terminal linked to a cathode (−). The electrode 12-1 of the connected shape is equipped with the crooked part to which the edge hangs on to the above-mentioned cleaning-chemical liquid tank 3 on the top side while connecting an anode (+). A tail end is dipped in the above-mentioned electrolytic-cleaning liquid in the excretory open end of a pipe in the electrolytic-cleaning liquid of the above-mentioned cleaning-chemical liquid tank 3, which ejects electrolytic-cleaning liquid in the cleaning-chemical liquid tank 3. The purification system which carries out its ejection with the filtration apparatus with which are connected the other ends of these excretory pipes. The pump is for circulation and connects with this purification device and absorbs washed electrolytic-cleaning liquid. Its end is installed in the drain hole of this pump for a circulation. Other ends are piped at right angles to a corner of the above-mentioned cleaning-chemical liquid tank 3. While it has a feed pipe which discharges washed electrolytic-cleaning liquid ejected from the above-mentioned pump for a circulation so that electrolytic-cleaning liquid in the cleaning-chemical liquid tank 3 may always reflux. Therefore, the supersonic wave from an ultrasonic transducer eliminates any attachment from the exterior of washed thing. Attachment floats by hydrogen gas made to send electric current of an electrode and a washed thing through basket 4, carrying out the electrolysis. The attachment inside of the cleaning-chemical liquid tank 3 is circulated and floated, so the above-mentioned pump for a circulation 8 washing the above-mentioned electrolytic-cleaning liquid, so the attachment is eliminated. Then, a rinse tank is made for dipping a metal basket 4 by which a more detailed item to be washed is hung, and elimination washing of an electrolyte and the attachment is carried out completely.

DETAILED DESCRIPTION

Figure 1:
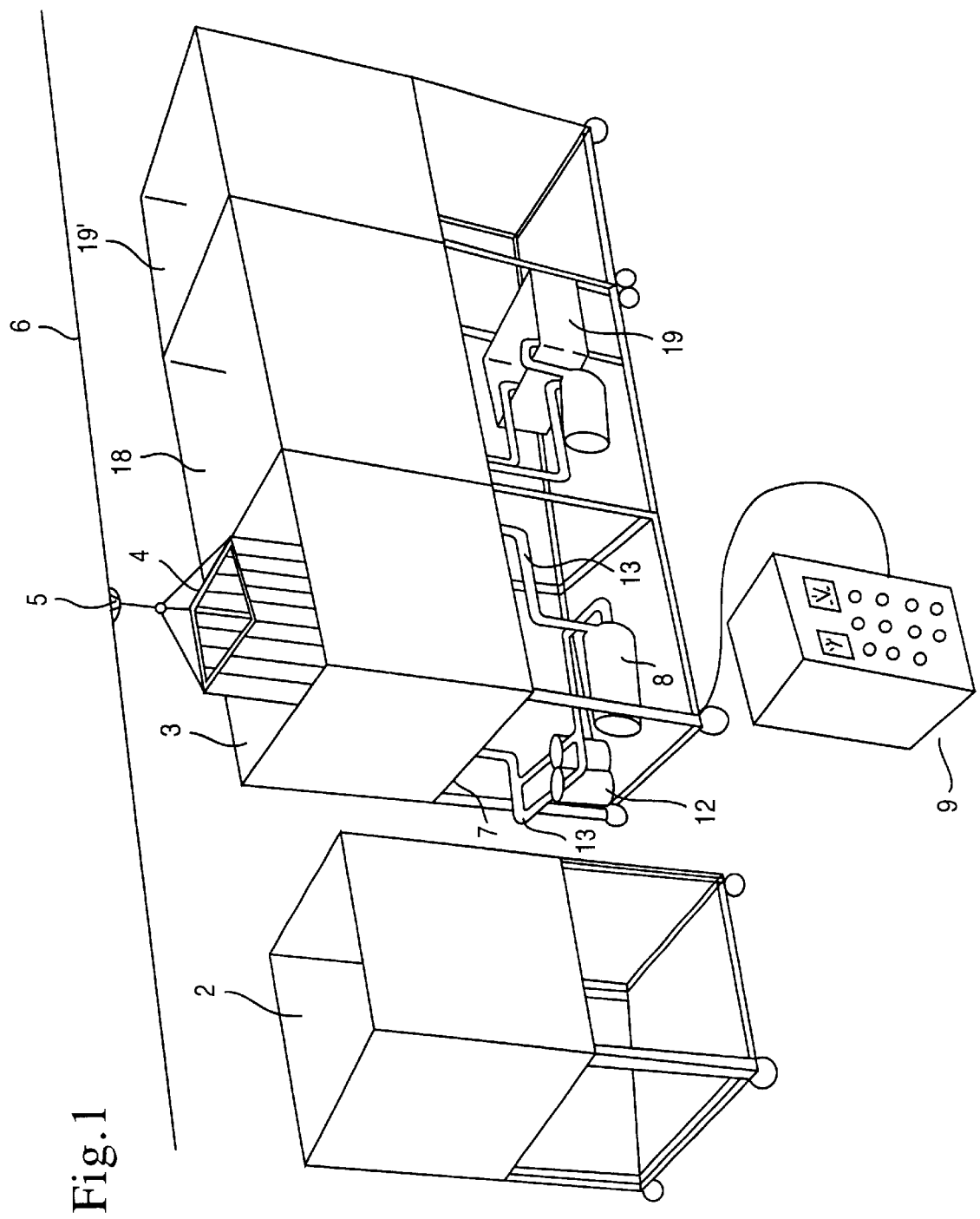
FIG. 1 is the perspective diagram showing the whole washing system of this invention.

FIG. 1 shows the washing system of synthetic resin metal die of this invention. It consists of a degreasing processing device, an electrolytic-cleaning device, and a rinse device. This electrolytic-cleaning device uses together the washing method of an ultrasonic method and an electrolysis method. Attachments such as the resin adhering to washed things (not shown), such as a die, are eliminated reliably in a short time.

The degreasing processing device 2 adjoins an electrolytic-cleaning device, as shown in FIG. 1. Organic degreasing solvents, such as ether and an alcohol, are accommodated in the tank of the same magnitude as an electrolytic-cleaning tank. The item to be washed is put in basket 4, heating equipment 3-1 warms solvents. Basket 4 carries out dipping with the hanging implement 5 at the degreasing tank 2, and degreasing dispensation is performed. Then, it withdraws from the degreasing tank 2, and transfers to the electrolytic-cleaning tank 3.

The hanging implement 5 positions into the electrolytic-cleaning device 3 from the rail 6 from the degreasing device top, and was from this rail 6, basket 4 is hung consisting of a washed thing retention implement which accommodates a washed thing on the lower portion at the trader board 7. The basket is able to descend and ascend freely. The cleaning-chemical liquid tank 3 accommodates electrolytic-cleaning liquid. A sewage purifier and the pump for circulation 8 are configured, and the power transducer for electrolysis 9 is installed beside the bottom of basket 4.

As above-mentioned, the electrolytic-cleaning liquid, an alkali solution, contains from about 1.5 to about 10% by weight of sodium hydroxide, from about 4 to about 20% by weight of EDTA (ethylene diamine tetra acetic acid), and from about 4.5 to about 24% by weight of surface active agents, and the residue is water.

Figure 4:
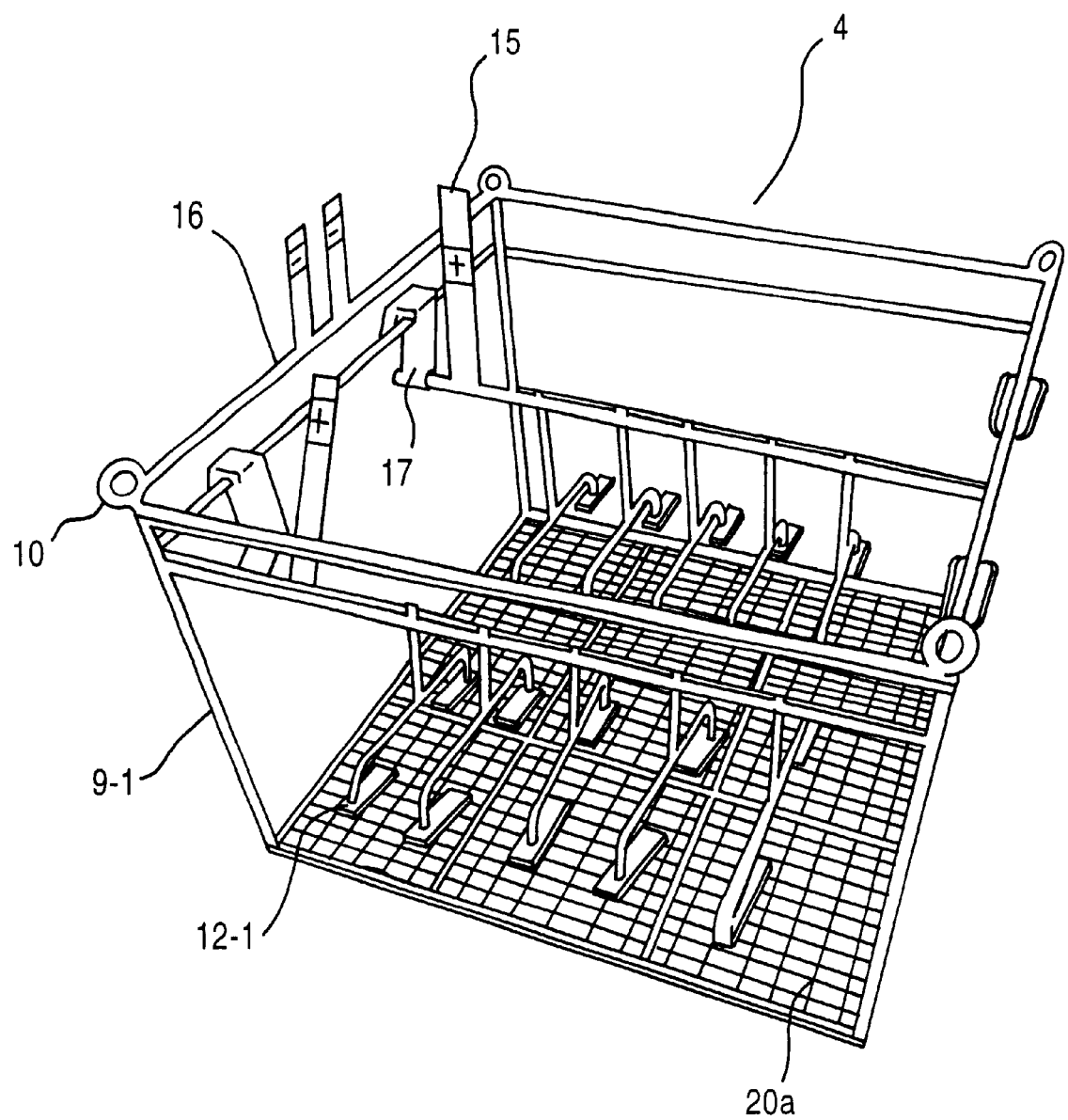
FIG. 4 is the perspective diagram of the placement of the washed item on basket 4 with the attached electrode.

It is formed with materials which have the conductivity of stainless steel, etc. As shown in FIG. 4, the above-mentioned basket 4 has a frame body 20a (diameter of 3 mm) of a rectangular parallelepiped shape and of a smaller size than the above-mentioned cleaning-chemical liquid tank 3. The cylindrical lattice of the four sides of the frame body 9-1 with a spacing of which a washed thing does not fall in the field, except the top part. Moreover, the retention stick 10 is made to project as four corners of the upper extremity of frame body 9-1. The basket 4 is loaded into the above-mentioned cleaning-chemical liquid tank 3, and is located so as not to contact the base of the cleaning-chemical liquid tank 3.

The above-mentioned cleaning-chemical liquid tank 3 is made from stainless steel, and an internal capacity of 200 liter is desirable.

Figure 2:
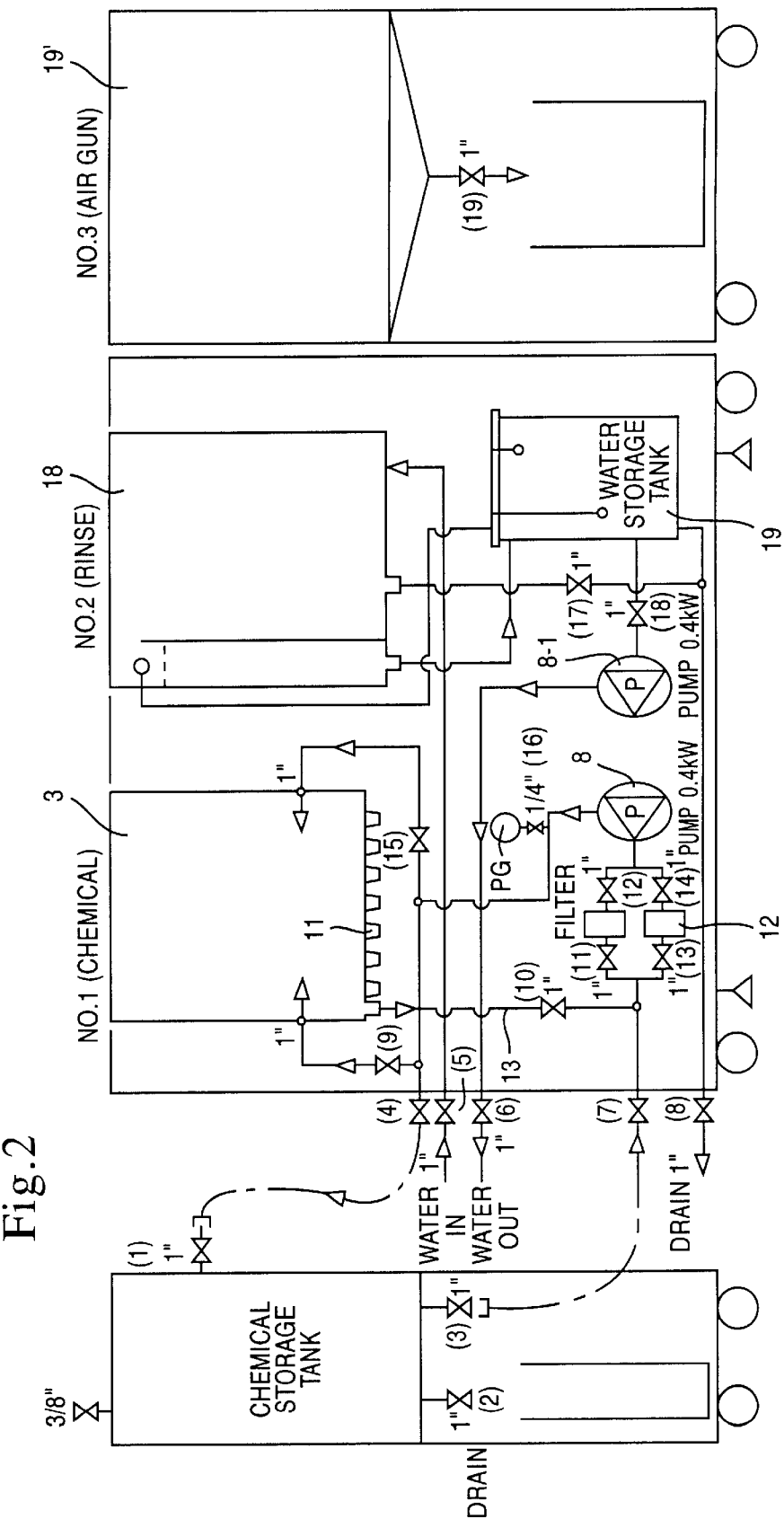
FIG. 2 is the organization chart of the whole washing system of this invention.
Figure 3:
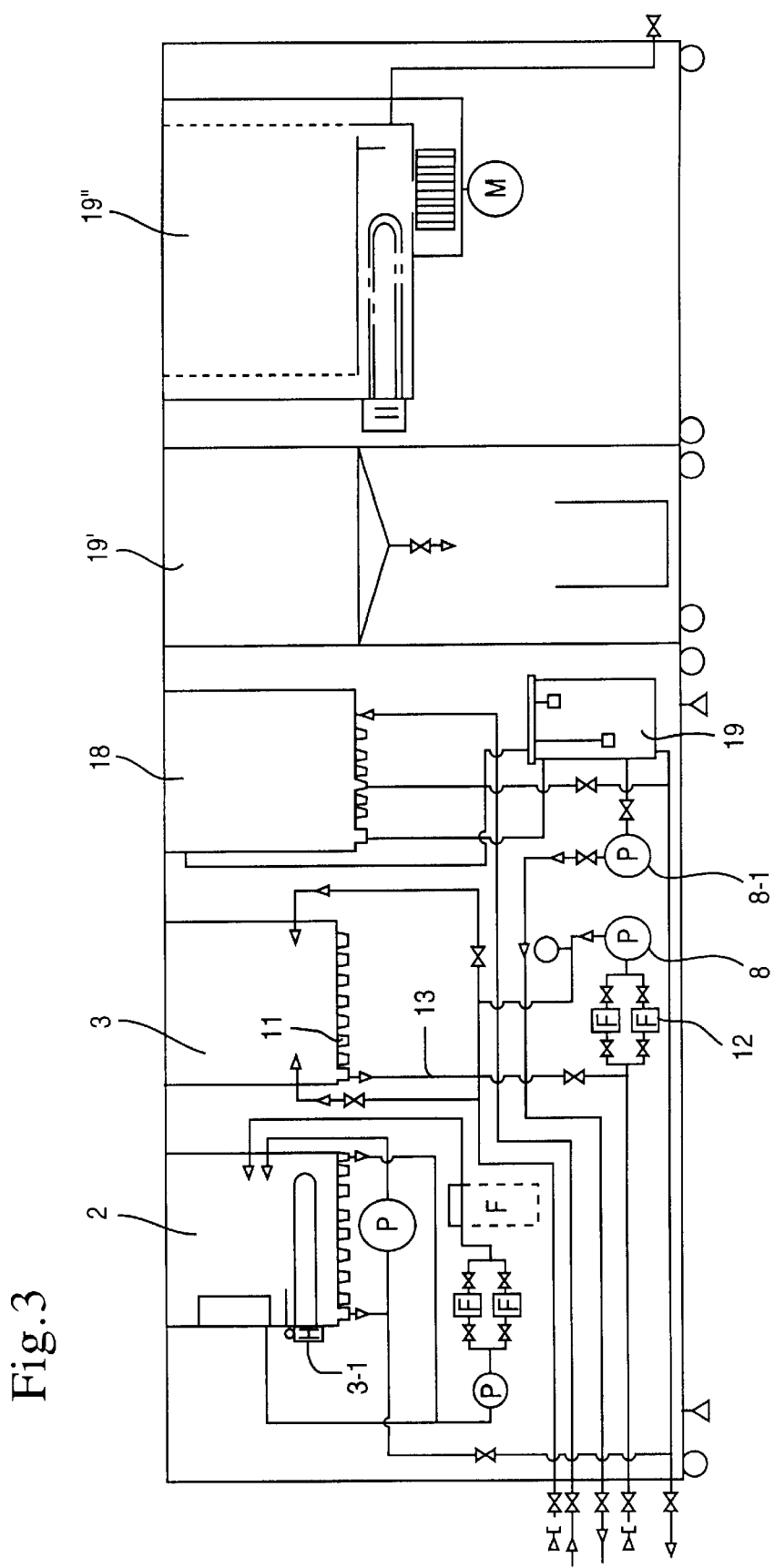
FIG. 3 is the organization chart of other cases of the operation of the whole washing system of this invention.

In order to conduct the ultrasonic washing from the base outside of the cleaning-chemical liquid tank 3, as shown in FIG. 2, the ultrasonic transducer 11 connects with the above-mentioned power supply box 9. The number of ultrasonic transducer modules are from 6 to 48, and they are located in a longitudinal direction and in a side direction with the necessary spacing between each one. It is desirable to install resonance inhibition material among these ultrasonic transducers.

Two metal sticks are installed in basket 4 through insulating material made from a synthetic resin at a lengthening joint. Every stick hangs and pegs a metal stick, and eight electrodes 12-1 are submerged in the center section of the cleaning-chemical liquid tank 3. The anode (+) side of the direct current source is applied through the above-mentioned transducer for electrolyses 9 (discussed below) to this electrode 12-1. A cathode (−) is connected to the above-mentioned basket 4. Electric current through the above-mentioned electrolytic-cleaning liquid causes the electrolysis. The material used typically for electrodes, such as graphite, can be used for an electrode 12-1.

The circulation device of electrolytic-cleaning liquid has the bobbin-winding-like filter (5 micro–10 micro) 12, which has a filtration element in the above-mentioned sewage purifier, and it washes electrolytic-cleaning liquid. It discharges in the cleaning-chemical liquid tank 3 with the above-mentioned pump for a circulation 8. Electrolytic-cleaning liquid in this cleaning-chemical liquid tank 3 is circulated. The electrolyte circulator in an electrolytic-cleaning device ejects excessive electrolytic-cleaning liquid to the above-mentioned sewage purifier, and it circulates the electrolytic-cleaning liquid.

Figure 5:
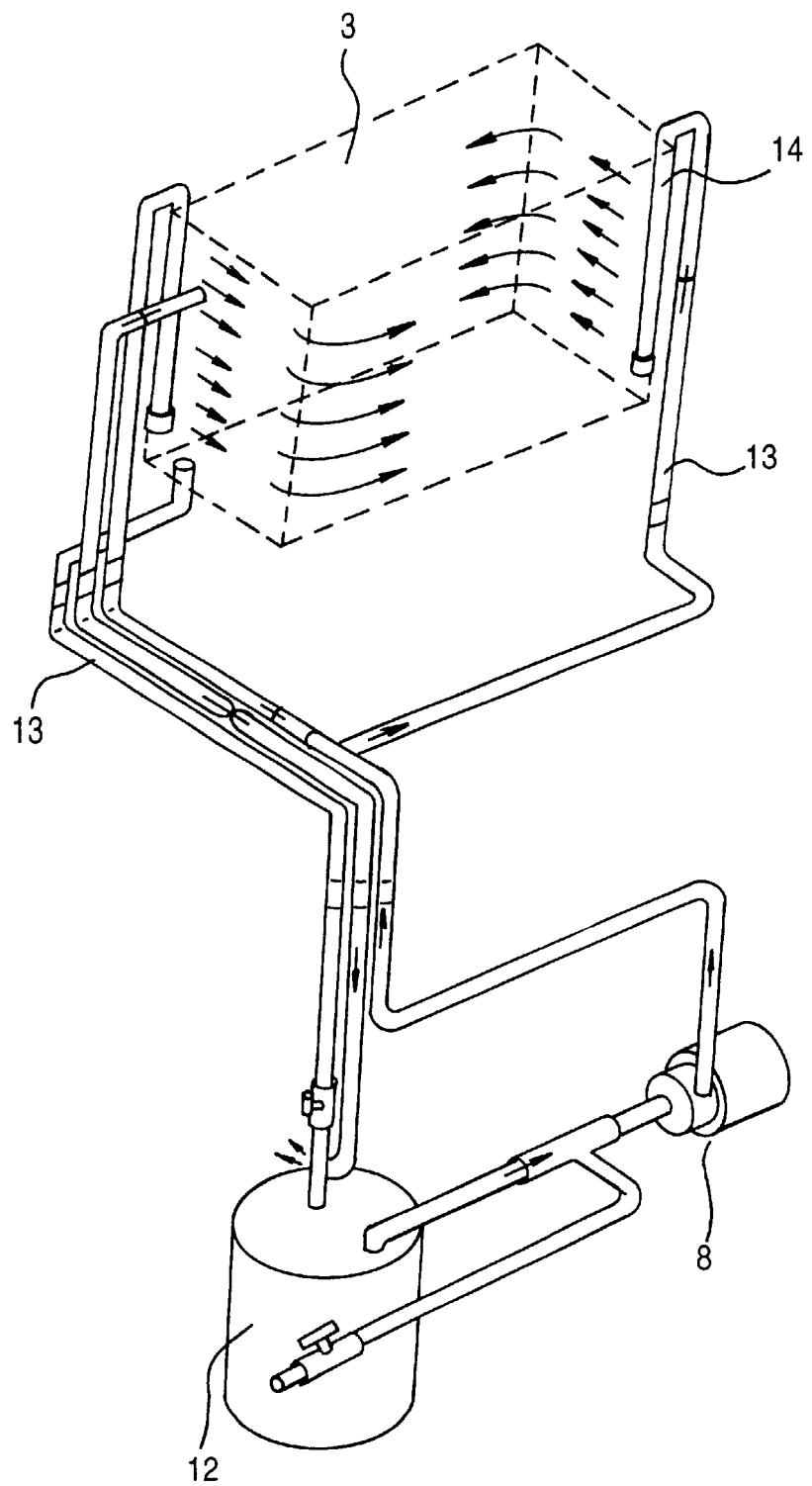
FIG. 5 is the perspective diagram showing the pipe-arrangement of electrolytic-cleaning liquid circulation.

As shown in FIG. 5, the sewage purifier 12 and the inhalation mouth of the pump for a circulation 8 have been underneath a feed pipe 13, and it is connected with the feed pipe 13 at the drain hole of the cleaning-chemical liquid tank 3 to the pump for a circulation 8 in its lower region. It is made flexible. This feed pipe 13 branches in two through an intermediate pipe in an upper region, and feed pipes 13 and 13 to the cleaning-chemical liquid tank 3.

These feed pipes 13 and 13 extend to the cornets of the cleaning-chemical liquid tank 3 near the base. Feed pipes 13 and 13 then bend perpendicularly and extend between upper and lower parts to the top. They open at necessary spacing in the side part of the cleaning-chemical liquid tank 3 by the side of corner part in the adjoining width direction at a lengthening joint (perpendicularly), and there are the multiple discharge holes 14. In addition, these feed pipes 13 and 13 are such that they may not stick to basket 4 when it is in the cleaning-chemical liquid tank 3. Moreover, in the cleaning-chemical liquid tank 3, the liquid-level is such that electrolytic-cleaning liquid of the necessary quantity is accommodated in the core and piped in though excretory ducts, and these excretory ducts are connected to the sewage purifier below.

Therefore, as shown in FIG. 5, electrolytic-cleaning liquid enters through a feed pipe 13 from a sewage purifier 12 by driving the pump for circulation 8, and this electrolytic-cleaning liquid is discharged in the cleaning-chemical liquid tank 3 through feed pipes 13 and 13 from this pump for circulation 8. In this cleaning-chemical liquid tank 3, liquid discharges in the same direction through the discharge holes 14 of the above-mentioned feed pipes 13 and 13, and the electrolytic-cleaning liquid convects. The convection current of this electrolytic-cleaning liquid flows at a constant rate between the top and bottom sides of the cleaning-chemical liquid tank 3 using the above-mentioned discharge holes 14. Moreover, excess electrolytic-cleaning liquid is ejected by the sewage purifier 12 through the above-mentioned excretory duct 13. The waste attachment in electrolytic-cleaning liquid is eliminated using the above-mentioned bobbin-winding filter 12, and the clean electrolytic-cleaning liquid is again channeled into the cleaning-chemical liquid tank 3. Moreover, when the electrolyte level drops, electrolytic-cleaning liquid can be refilled at any time from a service tank.

To prevent washed items from contacting the liquid and becoming damaged during the convection and the churning effectiveness of the electrolytic-cleaning liquid from falling and the elimination efficiency from dropping, the flow rate of the electrolytic-cleaning liquid produced by the above-mentioned pump for a circulation 8 is set to correspond to the magnitude of a washed item, and the capacity of the cleaning-chemical liquid tank 3, and is set at about 100 liters per minute.

Furthermore, the lower side of the cleaning-chemical liquid tank 3 has a waste-lye pipe, and the nose of cam in which the drain cock was prepared is made to extend to near the above-mentioned sewage purifier 12. And the waste-lye pipe 13 which prepared the drain cock also in the interval of the feed pipe 13 which connects a sewage purifier 12 and the pump for a circulation 8, at the nose of cam through intermediate pipe is piped, and a washed thing is washed and it enables it to eject outside unclean electrolytic-cleaning liquid timely with a hose etc.

An exchange electric current is applied from the above-mentioned power supply box 9, which applies the exchange electric current to an ultrasonic transducer 11, and it sends a supersonic wave. Moreover, after applying an exchange electric current to the above-mentioned transducer for electrolyses simultaneously, while the direct current transformed by this transducer for electrolyses is received and an anode current is applied to an electrode 12-1, a cathode current is applied to basket 4, and it is made to send electric current through electrolytic-cleaning liquid, and it is made to carry out an electrolysis.

As shown in FIGS. 1 and 4, anode terminal and cathode terminal, to which the anode (+) electric current from the above-mentioned transducer for electrolyses 9 and a cathode (−) electric current are applied, are connected to a power supply box 9 at its front. While the connection cord connects the anode terminal to the electrode shank 15, another connection cord connects the cathode terminal to the positioning part 16 of the longitudinal-joint on both sides of above-mentioned basket 4 (FIG. 4). Thus, direct current passes again from the above-mentioned transducer for electrolyses 9 through basket 4 to an electrode 12-1 at the washed item, so electric current flows through the electrolytic-cleaning liquid, and electrolysis is effected. In addition, since electrode supports 17 of the electrode shank 15 are insulating, the cleaning-chemical liquid tank 3 is insulated by synthetic resin insulating material, the problem of a short circuiting does not arise.

Also, the power supply box 9 has a pilot lamp which lights when sending electric current from the main power supply and is interlocked with an activity timer. The power supply box 9 also has a wall socket which is interlocked with an activity timer and has outputs of 100V–230V AC.

Since the power supply gives too little voltage, alkali burning will arise. On the other hand, if the voltage is too high, cleaning will not be effective. The power should be adjusted to 7–8 V and 161 A, depending on the size of the die. Moreover, the pilot lamp displays the status of the electrolyses 9 when it is switched and during electrolysis. In addition, the power supply box 9 and the transducer for electrolyses of the above-mentioned structure can also be formed integrally.

The rinse device 18 discharges waste rinse liquid from a rinse tank to the waste rinse liquid storage tank 19 which contains a liquid-level switch for controlling a waste rinse liquid discharge pump. The rinse device 18 also applies rinse liquid with the pipe which joins with the electrolysis device and has a tank made from stainless steel of the same size as the cleaning-chemical liquid tank 3. The washed item is moved to the rinse tank 18 and hung on the hanging implement 5. Then, it is dipped in a rinse work such as water. The attachment is eliminated and the strongbase electrolyte is washed off at the same time.

The above-mentioned washing system operates as follows: First, after hanging an item (e.g., a metal die) which was in basket 4 with the electrode removed after electrically heating the degreasing tank 2 which accommodated the solvent, the basket 4 with the washed items are again dipped in the degreasing tank 2 for a fixed time, and after that, the item is hung again, and the washed item is then transferred to an electrolysis system with basket 4.

After it is confirmed that the main power supply (not shown in the figure) is off, a cord is connected by the side of the electrode shank 15 and the anode of power supply box 9, and the cord is also connected by the side of the edge of the positioning part 16 of basket 4 and the cathode of a power supply box 9.

Next, electrolytic-cleaning liquid is added to the cleaning-chemical liquid tank 3 and a sewage purifier. Subsequently, a washed item is accommodated in the center of basket 4. Subsequently, an electrode 12-1 is attached and hung, and the above-mentioned basket 4 is hung inside the cleaning-chemical liquid tank 3, and basket 4 is held.

Afterwards, the main power supply of the above-mentioned power supply box 9 is activated, an activity timer begins timing, and the washing operation of a washed item proceeds. That is, while a supersonic wave oscillates from an ultrasonic transducer 11, the above-mentioned pump for circulation 8 actuates, and electrolytic-cleaning liquid in the cleaning-chemical liquid tank 3 is convected and circulated.

With different washed items, washing time differs. After the fixed setup time, the above-mentioned activity timer manually or automatically discontinues the electric current to the pump 8 and the driver for ultrasonic transducers 11. The activity timer of the above-mentioned power supply box 9 stops the oscillation of electrolytic-cleaning liquid and the electrolytic action of the washed item and the electrode 12-1.

As the washing system of this invention uses both the electrolysis and ultrasonics, attachments from the exterior of washed items float due to hydrogen gas generated by the electrolysis washing method formula, and it eliminates attachments from washed items by the reflux of electrolytic-cleaning liquid.

The eliminated attachment is displaced by the reflux of above-mentioned electrolytic-cleaning liquid, and is ejected from the above-mentioned excretory duct 13 to the bobbin-winding filter 12, and separation elimination is carried out from electrolytic-cleaning liquid. That is, since the eliminated attachment is unlikely to adhere to a washed item again, the washing efficiency can be increased and the useful lifetime of the electrolytic-cleaning liquid can be increased.

After the end of the electrolytic-cleaning, the washed item hangs again, and is then transferred to the rinse tank 18 with basket 4 by hanging tool 5. It is dipped in the rinse tank 18, which is filled with rinse liquid, such as water, and the electrolyte and the attachments adhering to the washed item are washed away. Then, the washed item is lifted with basket 4 by hanging tool 5, and it transfers to another booth 19'. Any adhering liquid is blown away by an air gun. Then the washed item is taken out from the booth 19' and transferred to booth 19", which has a humidity decreasing device. Therefore remaining humidity is eliminated by the hot air passing through it.

EFFECTIVENESS OF INVENTION

The washing station of the present invention has the following effectiveness: First, compared with an electrolytic-cleaning apparatus configured with only the usual electrolyzer, by adding electrolyte rinse dispensation degreasing processing (pretreatment after-treatment), the cleaning effect of an attachment has very high potential and the alkali burning can be authentic protected.

The ultrasonic transducer, using a supersonic wave directed to the base of the cleaning-chemical liquid tank 3 which accommodates the electrolytic-cleaning liquid, vibrates the electrolytic-cleaning liquid. The ultrasonic method enables the electrolysis washing of an item. Moreover, the above-mentioned cleaning-chemical liquid tank 3 has a conducting retention implement, which contains the item to be washed to be and is connected with an electrode. The retention implement connects to cathode (−), and it is dipped in electrolytic-cleaning liquid connected with the anode (+). The cathode then sends electric current, and electrolysis proceeds.

Since basket 4 hangs the item to be washed during the series of operations, activity efficiency is high and can prevent the damage from the electrolyte attachment to an operator to the minimum extent, and it can work in the very safe integrity. Moreover, since it becomes a series of operation and the washed thing of the various sizes from a detailed metallic pattern to a medium-sized metallic pattern can be acted, it is efficient.

Moreover, when the bobbin-winding filter was placed in the above-mentioned sewage purifier between the above-mentioned excretory duct and the circulation pump, any attachment eliminated from the washed item as mentioned above flows with the convection current of electrolytic-cleaning liquid and is ejected from excretory duct by this washing system. In the fashion, the above-mentioned filter removes these attachments. That is, by applying only washed electrolytic-cleaning liquid in the cleaning-chemical liquid tank 3, the eliminated attachment cannot be carried to be attached with a washed item, the life time of the electrolytic-cleaning liquid is longer. The step for filling of electrolytic-cleaning liquid is reduced, thus the activity efficiency is improved.

Moreover, in this washing system, the alkali solution, which consists of sodium hydroxide from about 1.5 to about 10% by weight, EDTA from about 4 to about 20% by weight, from about 4.5 to about 24% by weight of a surface active agent containing $Rn—COOH$, which R is $(CH_2=CH—)$ and n is integer number between 20 to 28, and water, is used for electrolytic-cleaning liquid. Therefore, applying electric current with an electrode enables reliable performance in the above-mentioned washed item.

What is claimed is:

1. A cleaning machine for a die used for a synthetic resin mold, said cleaning machine comprising:
   a degreasing processing system,
   an electrolytic-cleaning system with an electrolyte circulator system,
   and a rinse system in which electrolytes are removed from a washed die;
   the electrolytic-cleaning system having an ultrasonic transducer which generates ultrasonic agitation in an electrolysis liquid tank which accommodates electrolytic-cleaning liquid,
   said cleaning machine also including a die receipt container and a container hanging implement, wherein the washed die in the container is hung and flooded with electrolytic-cleaning liquid, the container in the washing tank being connected to the minus electrode of a power source, and the plus electrode connected to electrode shanks that are hung on electrode supports attached to said container; whereby the electrolytic cleaning of the die causes efficient cleaning of the die.

2. The cleaning machine of claim 1, wherein the degreasing processing system comprises a degreasing tank and a heating apparatus to prepare in advance the die washing by dipping the die in a degreasing solvent before dipping the die in the electrolyte of a washing station.

3. The cleaning machine of claim 1 or claim 2, wherein the electrolyte circulator system comprises an electrolyte liquid feed tank, an electrolyte filtration part, and a circulating pump which circulates an electrolyte.

4. The cleaning machine of claim 1 or claim 2 wherein the electrolyte rinse system comprises an electrolyte rinse tank located separately from the cleaning-chemical liquid tank for promoting removal of electrolyte from a washed article by flooding a washed article with rinse liquid.

5. A cleaning machine for a die used for a synthetic resin mold, said cleaning machine comprising:
   a degreasing processing system,
   an electrolytic-cleaning system with an electrolyte circulator system,
   a rinse system in which electrolytes are removed from a washed die,
   and a humidity decreasing system;

the electrolytic-cleaning system having an ultrasonic transducer which generates ultrasonic agitation in an electrolysis liquid tank which accommodates electrolytic-cleaning liquid, said cleaning machine also including a die receipt container and a container hanging implement, wherein the washed die in the container is hung and flooded with electrolytic-cleaning liquid, the container in the washing tank being connected to the minus electrode of a power source, and the plus electrode connected to electrode shanks that are hung on electrode supports attached to said container; whereby the electrolytic cleaning of the die causes efficient cleaning of the die.

6. The cleaning machine of claim 5, wherein the degreasing processing system comprises a degreasing tank and a heating apparatus to prepare in advance the die washing by dipping the die in a degreasing solvent before dipping the die in the electrolyte of a washing station.

7. The cleaning machine of claim 5 or claim 6, wherein the electrolyte circulator systemcomprises an electrolyte liquid feed tank, an electrolyte filtration part, and a circulating pump which circulates an electrolyte.

8. The cleaning machine of claim 5 or claim 6, wherein the electrolyte rinse system comprises an electrolyte rinse tank located separately from the cleaning-chemical liquid tank for promoting removal of electrolyte from a washed article flooding a washed article with rinse liquid.

9. The cleaning machine of claim 5 or claim 6, wherein the humidity decreasing system comprises a humidity decreasing booth, a heating apparatus, and a blower for eliminating humidity from the mold by blowing air through the heating apparatus.

* * * * *